United States Patent Office 2,721,877
Patented Oct. 25, 1955

2,721,877

LUBRICATING OIL ADDITIVES AND A PROCESS FOR THEIR PREPARATION

Alexander H. Popkin, New York, N. Y., and James F. Black, Roselle, N. J., assignors to Esso Research and Engineering Company, a corporation of Delaware No Drawing. Application August 22, 1951, Serial No. 243,158

9 Claims. (Cl. 260—485)

This invention relates to a process for the preparation of lubricating oil additive materials and the products prepared thereby. Particularly the invention relates to an improved process for the preparation of pour point depressing additive materials for combination with waxy mineral lubricating oils. More particularly the invention relates to an improved process for the preparation of pour point depressing lubricating oil additive materials by copolymerizing an ester of an unsaturated polycarboxylic acid prepared in the presence of an excess of an esterification agent with a second polymerizable material.

The art of lubricating oil additive manufacture has long been familiar with the preparation of polymers and copolymers to form materials useful for improving desirable characteristics of lubricating oils. Of particular interest in recent years has been the development of additive materials for improving the viscosity index, that is, for reducing the rate of change of viscosity of an oil with a change in temperature, and for improving the pour point of a lubricating oil, that is lowering the temperature at which the lubricating oil loses its property of free flow. Such materials as polymers and copolymers of acrylate esters, polymers and copolymers of alpha-beta unsaturated polycarboxylic acid esters, etc., have been found to be very satisfactory for many purposes. It has also been found, however, that the preparation of these polymers and copolymers presents many technical difficulties. Foremost among them is the problem of gelation and the formation of oil insoluble products. It is believed that this phenomenon is a result of undesirable cross linking or inter-linking of neighboring long chain molecules with the result that the product formed remains a cohesive mass and will not dissolve in the oil used as the blend oil.

In cases where there is insufficient cross linkage present to cause gelation and oil insolubility of product, there may be present sufficient cross linkage to result in products having a greatly reduced potency, as will be shown more in detail below.

It has now been found, and forms the object of this invention, that copolymers having outstanding utility as pour point depressants may be prepared by a process which eliminates the undesirable gelation and formation of oil insoluble products and, as such, represents decided improvement in the art of preparation of pour point depressants.

Briefly and summarily stated, this improvement comprises the steps of preparing unsaturated polycarboxylic acid esters in the presence of an excess of an alcohol as the esterification agent, and copolymerizing the acid esters so formed with a low molecular weight polymerizable compound in the presence of a copolymerization catalyst.

The improved process of this invention is applicable to the polymers or copolymers of esters in general. It has particular advantage, however, when applied to the copolymerization of unsaturated polycarboxylic acid esters with other polymerizable monomeric materials in the presence of peroxide catalysts.

The unsaturated polycarboxylic acid esters may be represented by the following formula:

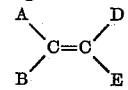

wherein
(1) A and D are carboxylic acid ester groups

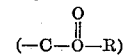

and B and E are hydrogen, e. g., fumaric acid esters, maleic acid esters, etc., or (2) A and D are carboxylic acid ester groups, as above, and either B or E is a methyl group, the other being hydrogen, e. g., citraconic acid esters, mesaconic acid esters, etc., or (3) A and B are hydrogen, D is a carboxylic acid ester group, and E is a methylene carboxylic acid ester group, e. g., itaconic acid esters, or (4) A and D are carboxylic acid ester groups as above, E is a methylene carboxylic acid ester group, and B is hydrogen, e. g., aconitic acid esters.

It will be noted that the unsaturation in all of these compounds is alpha-beta to at least one carboxy group. Although any of the polycarboxylic acid esters, according to the formula above, or mixtures of such polycarboxylic acid esters, are operable in the process of this invention, the fumaric acid esters and maleic acid esters are particularly advantageous. Mixtures of two or more of such unsaturated polycarboxylic acid esters in varying proportions, i. e., 10–90 parts fumaric and 90–10 parts maleic ester, may be used in place of only one ester.

The esters may be prepared by esterification of any of the unsaturated polycarboxylic acids or their corresponding anhydrides with which the art is familiar.

The alcohols used in preparing the esters of the polycarboxylic acids or their anyhdrides are selected from the $C_1$ to $C_{18}$ aliphatic alcohols. Primary alcohols are preferred over secondary and tertiary alcohols, although secondary alcohols are sometimes suitable. The alcohols are preferably saturated, although some degree of unsaturation is permissible when mixtures of alcohols are employed. Straight chain or lightly branched alcohols are preferred over highly branched alcohols.

In the alcohols selected for preparing the esters, there should be sufficient hydrocarbon content to insure solubility of the final polymer products in lubricating oils, which in the case of most oils requires that the alcohols have on the average at least about 7.5 carbon atoms per molecule. When employing single alcohols those ranging from $C_8$ to $C_{18}$ are suitable. When mixtures of alcohols are employed, those ranging from $C_1$ to $C_{18}$ can be used in such proportions that the average is about $C_{7.5}$ or greater.

In general, the products prepared according to the invention are both pour point depressants and viscosity index improvers. However, for optimum potency it is usually desirable to select the alcohols used in preparing the esters so that the product will be primarily a pour point depressant or primarily a viscosity index improver. For optimum pour depressing potency in a wide variety of mineral lubricating oils the alcohols should have on the average about 11 to about 15, preferably 11.5 to 14, carbon atoms per molecule. For optimum potency as a viscosity index improver the alcohols should have on the average about 7.5 to 11, preferably 8 to 10, carbon atoms per molecule. Exceptions are sometimes found, for example, products prepared from relatively short chain alcohols are good pour depressants in relatively light oils such as those employed as hydraulic fluids and power transmission fluids. For potent pour depressants, alcohols having long straight chains are greatly preferred.

Some branching in some of the alcohols is permissible, for example, mixed 2-ethylhexyl and cetyl alcohols are suitable, but a highly branched $C_{13}$ alcohol is entirely unsuitable for the production of pour point depressants unless employed with other alcohols having relatively long straight chains.

Among the alcohols that may be mentioned specifically as having utility in this invention are octyl, isooctyl, 2-ethylhexyl, nonyl, 2,2,4,4-tetramethylamyl, decyl, dodecyl, tetradecyl, cetyl, and stearyl alcohols. Mixtures of the above are operable so long as the components of the mixture are adjusted so that the average number of carbon atoms of the mixture is between 8 and about 18 carbon atoms. Thus methyl alcohol may be admixed with stearyl alcohol to obtain a mixture having an average side chain length within the desired range.

One especially desirable mixture of alcohols operable in this invention is the commercially available mixture known as "Lorol-B" alcohol and obtained by hydrogenation and refining of coconut oil. The distribution of the alcohols of this mixture and other commercially available alcohols are shown in the following table:

COCONUT OIL ALCOHOLS

|  | Lorol | Lorol B | Lorol 5 | Lorol 7 |
| --- | --- | --- | --- | --- |
| Decyl | 4 | 3 | 2.6 | 2.5 |
| Lauryl | 55 | 46 | 61.0 | 55.5 |
| Tetradecyl | 22 | 24 | 23.0 | 21.0 |
| Hexadecyl | 14 | 10 | 11.2 | 10.2 |
| Octadecyl | 4 | 17 | 2.2 | 10.8 |
| Ave | 12.8 | 13.5 | 13.0 | 13.4 |

Also very desirable copolymers may be formed by copolymerizing the polycarboxylic acid esters as described above with other polymerizable monomeric materials. These materials may be represented by the following formula:

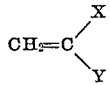

wherein
(1) X is hydrogen and Y is an ester group

R being methyl, ethyl, butyl, and the like) e. g., vinyl acetate, vinyl butyrate, and the like; or
(2) X is methyl, ethyl, etc., and Y is as described above, e. g., isopropenyl acetate, etc.; or
(3) X is a halogen and Y is as described above, e. g., alpha-chlorovinyl acetate, etc.; or
(4) X is a hydrogen or methyl and Y is an aromatic group, e. g., styrene, alpha-methyl styrene, and the like; or
(5) X is hydrogen or methyl and Y is $-C\equiv N$, e. g., acrylonitrile, etc.

Although any of the polymerizable monomeric materials typified by the formula above are operable to form useful copolymers with the polycarboxylic acid esters outlined above, the preferred embodiment contemplates the use of low molecular weight vinyl compounds, particularly vinyl esters and their substitution products. Mixtures of such vinyl esters, e. g., 10–90 parts of vinyl acetate and 90–10 parts of isopropenyl acetate, may be used in place of a relatively pure vinyl ester. Vinyl acetate is particularly desirable.

Depending upon the desired product, the monomers in the copolymerization reaction utilizing the process of invention may be varied greatly. However, when a copolymer of a polycarboxylic acid ester and vinyl acetate is being prepared, it is desirable that from 2% to 40% of vinyl acetate, preferably 10% to 25%, be used with the polycarboxylic acid ester. A copolymer of 80% dicarboxylic acid ester with 20% vinyl acetate has outstanding pour depressant qualities.

The process of the instant invention may be applied to any of the well known polymerization techniques. For instance, the bulk polymerization technique wherein the catalyst used is added directly to the mixture of the monomers alone may be used applying the process of invention. If it is desired, the solution polymerization technique may be utilized, that is, the technique in which the monomers are polymerized in solution in a solvent, for example, naphtha, lubricating oil fractions, white oils, benzene, toluene and other petroleum hydrocarbons, as well as esters, ethers and chlorinated solvents such as chloroform, carbon tetrachloride, etc. When the solution polymerization technique is used, it is preferred that the monomer concentration in the diluent range from 30% to 99% by weight, based on the weight of the total mixture. The suspension technique of polymerization or the emulsion polymerization technique wherein an emulsifying agent such as a soap is used to form an emulsion of the monomers and water and a water soluble catalyst is utilized may also be adapted to the process of invention with excellent results.

The reaction conditions to be experienced in the inventive process may also be varied within wide ranges. In the preferred embodiment, the copolymerization of dicarboxylic acid esters with other polymerizable materials, it is preferred that temperatures within a range of from room temperature to 250° F., preferably 100° F. to 200° F., be utilized. In most instances it will be found advantageous to utilize from 0.05% to 3% by weight, based on the weight of the monomers, of a peroxide catalyst, with 0.2% to 2.0% by weight being preferred. The peroxide catalysts may be added at the start of the reaction, in small portions at the early stage of the reaction, or during the entire course of the reaction. In general, milder copolymerization conditions are obtained with lesser amounts of catalyst or if the catalyst is added in small portions during the copolymerization. Among the operable catalysts are hydrogen peroxide, benzoyl peroxide, cumene hydroperoxide, potassium persulfate, lauroyl peroxide, ammonium persulfate, urea hydroperoxide, tertiary butyl hydroperoxide, tertiary butyl perbenzoate, and the like, benzoyl peroxide being used in the preferred embodiment. Reduction-oxidation activators known by the name of "Redox," for example, benzoin and ferris laurate, may be used if desired.

The time of the reaction may vary from 1 to 50 hours, with from 3 to 24 hours being generally sufficient.

It is to be particularly pointed out, that the gist of the instant invention involves the use of a polycarboxylic acid ester monomer that has been prepared by esterification of the acid in the presence of an excess of an alcohol esterification agent. The invention is particularly useful when such esters are substantially neutral, for example when the esters have been washed free of both excess acid or half acid ester and of any acidic esterification catalyst, such as toluenesulfonic acid or sulfuric acid. It has been found, as will be pointed out more specifically below, that the excess alcohol must be present during the esterification reaction in the amount of at least about 2.5%, based on the ester monomer. For ordinary purposes, and at the greatest economic advantage, the upper limit will be about 15%, percentages being by weight, based on the weight of the ester monomer. A preferred range is between 5 and 10%. The excess alcohol is not removed from the ester prior to copolymerization. In fact it may be desirable to add additional quantities of alcohol prior to copolymerization. It is to be noted particularly that the presence of alcohol in the copolymerization reaction alone is not sufficient to bring about the desired results, but that excess alcohol must also be present during esterification. This is shown by a consideration of the following examples, set forth for purposes of illustration only.

In a typical ester preparation, 55.37 pounds of Lorol B alcohol, 14.83 pounds of fumaric acid, 19.50 pounds of a heptane fraction (employed as a water entrainer) and 114 g. of concentrated sulfuric acid were heated at 200–230° F., in equipment fitted with a reflux condenser and a trap to remove water from the reflux stream, until approximately the theoretical amount (4.61 pounds) of water was removed. The product ester was vacuum stripped to remove the heptane and was washed with dilute sodium carbonate solution and with water until neutral. The quantity of Lorol B alcohol employed was 2.37 pounds in excess of the stoichiometric quantity, this being equivalent to 3.75% excess based on the ester.

*Example I*

In a 400 cc. Erlenmeyer flask equipped with an air condenser and a thermometer well there was placed 120 g. of the fumarate ester of Lorol B alcohol, a commercial mixture of coconut alcohols having an average carbon chain length of 13.5. This ester was prepared by using a 2.3% excess of alcohol based on fumarate monomer and contained such excess in the 120 g. weight. To the ester there was added 30 g. of freshly distilled vinyl acetate and 7.5 g. (additional 5% based on total monomers) of the coconut oil alcohol used to esterify the fumaric acid. 1.5 g. (1%) of benzoyl peroxide was then added and the mixture heated to about 130° F. for 18 hours. The resulting copolymer was heavy, viscous, and oil soluble and had an excellent appearance.

*Example II*

A preparation similar to Example I above was made using the fumarate ester prepared with 2.3 wt. percent excess of the coconut alcohols, based on fumarate monomer. In this preparation, however, there was no alcohol added during the copolymerization step. After reacting for 18 hours at 130° F. in the presence of 1% benzoyl peroxide, an oil-insoluble gel resulted.

*Example III*

In this example a fumarate ester of coconut alcohols was prepared as in Examples I and II, that is, using sufficient alcohol so as to have present a 2.3 wt. percent excess based on fumarate monomer. During the copolymerization reaction there was added 5.0% by volume of a hydrocarbon diluent. After copolymerization for 18 hours at a temperature of 130° F. and in the presence of 1% of benzoyl peroxide catalyst an insoluble gel resulted.

*Example IV*

Using the technique described in Example I above a fumarate ester of the coconut alcohols of Example I was prepared. In this example 5 wt. percent excess of the alcohol was used. In this example, however, no excess alcohol was added during the copolymerization step. An excellent appearing oil-soluble copolymer resulted.

*Example V*

A preparation identical to that described in Example I was made except that the fumarate ester was prepared using stoichiometric amounts of the coconut alcohols, that is, 2 mols of alcohols were used per mol of acid. After 18 hours copolymerization at 130° F. in the presence of 1% benzoyl peroxide an oil insoluble gel was obtained.

*Example VI*

In this experiment the fumarate ester used in the copolymerization was prepared using stoichiometric amounts of the alcohol. However, a 7.3 wt. percent excess of the coconut alcohols based on total monomers was added during the copolymerization step. After the same polymerization time and conditions as described above the product was an oil-insoluble gel.

*Example VII*

Into a 5-liter 3-necked round bottomed flask equipped with a mechanical stirrer, a reflux condenser, a thermometer well, and a gas inlet tube there were placed 1800 g. of the fumarate ester of coconut alcohols. This ester was prepared using 2.3 wt. percent excess of the alcohols based on fumarate monomer. 450 g. of freshly distilled vinyl acetate was then added, along with 22.5 g. of benzoyl peroxide catalyst and 5.0% of additional coconut alcohols, based on weight of total monomers, as a copolymerization modifier. The contents were then heated at about 130° F. using a nitrogen blanket for a period of 9 hours. The product resulting was a heavy viscous oil-soluble copolymer of excellent appearance.

*Example VIII*

Following the procedure described in detail in Example VII above a copolymer product was prepared using a fumarate ester of coconut alcohols which was formed from stoichiometric amounts of the acid and the coconut alcohols. The product which was obtained as a heavy polymeric oil-soluble material by short-stopping the reaction before a gel was formed, had relatively low pour point depressing potency.

*Example IX*

A copolymerization was run using the same conditions and reactants as employed in Example IV above, with the exception that the reaction mixture contained 15 weight percent of a conventionally refined Mid-Continent base white oil as diluent. The resultant product was a clear, viscous copolymer solution readily soluble in petroleum oil.

*Example X*

Another copolymerization was made using the same conditions and reactants as employed in Example IV above, with the exception that the reaction mixture contained 30 weight percent of a conventionally refined Mid-Continent white oil as diluent. The resultant product was also satisfactory in physical appearance, being a clear, viscous copolymeric solution readily soluble in petroleum oil.

*Example XI*

Into a 100 cc. polymerization tube, equipped with a standard tapered cover to which was fitted a capillary stop cock, were placed 30.00 g. of the fumarate ester of the coconut alcohols. This ester was prepared with stoichiometric amounts of alcohol and acid so that no excess of alcohol was present during the esterification. To this were then added 7.5 g. of freshly distilled vinyl acetate, making an 80 to 20 weight percent mixture of monomers, and 6.6 g. of a conventionally refined white oil representing 15% by weight of total monomers. To this mixture was then added 0.38 g. (1.0 wt. percent) of benzoyl peroxide catalyst, the mass was shaken at 130° F. until a uniform and clear solution resulted, and the resultant solution was allowed to react for about 20 hours. At the end of this period, the reaction product was present as a gel, insoluble in diluents such as mineral oils, chlorinated solvents, aromatic solvents, esters, ethers, ketones, etc., and completely useless as an additive for lubricating oils.

*Example XII*

Another copolymerization was made using the conditions, equipment, and reactants employed in Example XI with the exception that 16.1 g. (30 weight percent based on total monomers) of white oil was employed as diluent. The resultant product in this case, as in Example XI, was a gel, insoluble in lubricating oils and therefore useless as an additive for such oils.

The oil-soluble products obtained in Examples I through XII above were blended with Mid-Continent lubricating oils of SAE 10 and 20 grades in concentrations of 0.02 and 0.025 weight percent. The results of these tests are set out in Table I below along with comparative data obtained with the oil blends of a commercial pour point depressant (chlorowax-naphthalene condensation product).

TABLE I

| Ex. No. | Excess Alcohol in Ester Prep. | Additional Alcohol Added Prior to Copolymerization | Other Diluent[1] Added Prior to Copolymerization | SAE 10 | | SAE 20 | |
|---|---|---|---|---|---|---|---|
| | | | | 0.020% | 0.025% | 0.020% | 0.025% |
| I | 2.3 | 5.0 | 0 | −25 | −30 | −25 | −25 |
| II | 2.3 | 0 | 0 | (²) | (²) | (²) | (²) |
| III | 2.3 | 0 | 5.0 | (²) | (²) | (²) | (²) |
| IV | 5.0 | 0 | 0 | -------- | -------- | −25 | −25 |
| V | 0 | 5.0 | 0 | (²) | (²) | (²) | (²) |
| VI | 0 | 7.3 | 0 | (²) | (²) | (²) | (²) |
| VII | 2.3 | 5.0 | 0 | -------- | -------- | −30 | −30 |
| VIII | 0 | 5.0 | 0 | -------- | -------- | −15 | −15 |
| IX | 5.0 | 0 | 15.0 | -------- | -------- | −20 | −20 |
| X | 5.0 | 0 | 30.0 | -------- | -------- | −20 | −25 |
| XI | 0 | 0 | 15.0 | (²) | (²) | (²) | (²) |
| XII | 0 | 0 | 30.0 | (²) | (²) | (²) | (²) |
| Commercial Pour Depressant | -------- | -------- | -------- | 0 | −5 | 0 | −5 |

[1] Hydrocarbon white oil.
[2] Insoluble gel.

The pour depressant data of Table I above clearly point out the advantages of the process of the instant invention. It will be noted that in Example I where excess alcohol is used in the preparation of the ester and additional alcohol was added to the copolymerization step that an excellent pour depressant resulted. It is clearly pointed out in Examples II and III that 2.3% alcohol in the esterification step alone is insufficient and that the addition of other diluent such as white oil does not overcome the tendency to gel formation. In Example IV it is pointed out that 5% excess alcohol in the esterification step results in an excellent product. Examples V and VI point out the fact this phenomenon is not the result of monomers concentration alone. In these examples respectively 5% and 7.3% of excess alcohol was added to the copolymerization reaction, the fumarate ester being prepared with stoichiometric amounts of the acid and the alcohol. Gel formation resulted in both these instances. In Example VII, Example I has been repeated on a large scale and excellent pour depressant potency obtained. Example VIII illustrates the fact that the reaction can be stopped before the gel formation is completed but that if this is done a pour depressant of low potency is obtained. In the product of Example VIII there was some cross linkage, insufficient to form an oil insoluble product but sufficient to lower the pour depressing potency. Examples IX through XII point out again the fact that the obtention of oil soluble products of a high degree of pour depressing potency is not a function of monomers concentration. When in Examples IX and X an ester prepared with 5% excess of alcohol was used with a white oil diluent during copolymerization of 15% and 30% respectively a pour depressing potent product was obtained. Repeating the experiments using an ester prepared with stoichiometric amounts of the alcohol, that is no excess alcohol during the esterification step, an insoluble gel resulted.

The products prepared by the process of this invention may be blended with lubricating oils in concentrations varying from 0.001% to 20% by weight of active ingredient. For pour depressing action it is preferred that from 0.003% to 5% of the additive be blended with the lubricating oil. For viscosity index improvement amounts varying between 0.5% and 20% may be used. If it is desired, concentrates of the additives of invention may be prepared containing from 20 to 90% by weight of the additive material. It is often desirable to prepare these concentrates in such high concentrations for ease in handling and in storage.

The lubricant additives prepared according to the concept of this invention may be blended with any of the other known lubricant additives with excellent results. They can be used in motor oils, hydraulic oils, refrigerator oils, and as wax modifiers, etc. The inventive products are perfectly compatible with such materials as extreme pressure agents, oxidation inhibitors, other pour depressants, other viscosity index improvers, oiliness agents, corrosion inhibitors, and the like.

To sumarize briefly, this invention relates to an improved process for the preparation of pour point depressants (and products therefrom), by first preparing a long chain alcohol ester of an unsaturated polycarboxylic acid in the presence of an excess of the alcohol, said excess ranging from about 2.5% to 15.0% by weight, preferably about 5.0% to 10%, based on the weight of the ester, and then copolymerizing said ester with a low molecular weight polymerizable material in the presence of said excess alcohol. The preferred polycarboxylic acid is selected from the class of alpha-beta unsaturated dicarboxylic acids and their anhydrides and the long chain alcohol preferably has from 8 to 18 carbon atoms in a straight saturated chain. The preferred low molecular weight polymerizable material includes the low molecular weight vinyl esters, with vinyl acetate being used in the preferred embodiment.

What is claimed is:

1. In a process for the formation of lubricating oil additive materials which comprises copolymerizing (1) about 98 to 60% by weight of a substantially neutral ester prepared by esterifying (a) a material of the class consisting of alpha, beta-unsaturated polycarboxylic acids and their anhydrides with (b) substantially saturated primary aliphatic alcohol containing in the range of 8 to 18 carbon atoms per molecule with (2) about 2 to 40% by weight of a low molecular weight vinyl ester in the presence of a peroxide catalyst, the improvement which comprises carrying out said esterification in the presence of a stoichiometric excess of from 2.5% to 15% by weight of said alcohol and copolymerizing said neutral ester with said vinyl ester in the presence of said excess of alcohol.

2. Process according to claim 1 wherein said material of the class is fumaric acid.

3. A process according to claim 1 wherein said material of the class is maleic anhydride.

4. Process according to claim 1 wherein said molecular weight vinyl ester is vinyl acetate.

5. In a process for the formation of lubricating oil additive materials which comprises copolymerizing (1) about 90 to 75% by weight of a substantially neutral ester prepared by esterifying (a) a material of the class consisting of alpha, beta-unsaturated polycarboxylic acids and their anhydrides with (b) substantially saturated primary aliphatic alcohol containing in the range of 8 to 18 carbon atoms per molecule with (2) about 10 to 25% by weight of a low molecular weight vinyl ester in the presence of a peroxide catalyst at a temperature of about 100° to 200° F. for from about 3 to 24 hours, the improvement which comprises carrying out said esterification in the presence of a stoichiometric excess of from 5% to 10% by weight of said alcohol and copolymerizing said neutral ester with said vinyl ester in the presence of said excess of alcohol.

6. A process according to claim 5 wherein said material of the class is fumaric acid.

7. A process according to claim 5 wherein said low molecular weight vinyl ester is vinyl acetate.

8. In a process for the formation of lubricating oil additive materials which comprises copolymerizing (1) about 80% by weight of a diester prepared by esterifying (a) fumaric acid with (b) substantially saturated primary aliphatic alcohol containing in the range of 8 to 18 carbon atoms per molecule with (2) about 20% by weight of vinyl acetate in the presence of from 0.2 to 2.0% by weight of benzoyl peroxide catalyst at a temperature of about 100° to 200° F. for from about 3 to about 24 hours, the improvement which comprises carrying out said esterification in the presence of a stoichiometric excess of from about 2.5% to 15% by weight of said alcohol and copolymerizing said diester with said vinyl acetate in the presence of said excess of alcohol.

9. A lubricating oil additive material having the desirable characteristics of improving the pour point of a mineral lubricating oil into which it has been incorporated, which has been prepared by an improved process which comprises esterifying (a) a material of the class consisting of alpha, beta-unsaturated polycarboxylic acids and their anhydrides with (b) substantially saturated primary aliphatic alcohol containing in the range of 8 to 18 carbon atoms per molecule in the presence of a stoichiometric excess of from 2.5% to 15% by weight of said alcohol and copolymerizing (1) about 98 to 60% by weight of the resultant substantially neutral ester with (2) about 2% to 40% by weight of a low molecular weight vinyl ester in the presence of a peroxide catalyst and in the presence of said excess of said alcohol.

References Cited in the file of this patent

UNITED STATES PATENTS

| | | |
|---|---|---|
| 1,923,938 | Kyrides | Aug. 22, 1933 |
| 2,430,564 | Gordon | Nov. 11, 1947 |
| 2,460,035 | Rogers et al. | Jan. 25, 1949 |
| 2,543,964 | Giammaria | Mar. 6, 1951 |
| 2,570,788 | Giammaria | Oct. 9, 1951 |
| 2,575,992 | Bartlett | Nov. 20, 1951 |